United States Patent
Ando et al.

(10) Patent No.: US 8,374,647 B2
(45) Date of Patent: Feb. 12, 2013

(54) MOBILE TERMINAL DEVICE, CONTACT-LESS CARD FUNCTION MANAGEMENT SYSTEM AND CONTACT-LESS CARD FUNCTION ACQUISITION SYSTEM

(75) Inventors: Tomohiro Ando, Yokohama (JP); Hiroshi Kawabata, Sapporo (JP); Satoshi Washio, Sapporo (JP)

(73) Assignee: NTT Docomo, Inc., Tokyo (JP)

( * ) Notice: Subject to any disclaimer, the term of this patent is extended or adjusted under 35 U.S.C. 154(b) by 1067 days.

(21) Appl. No.: 11/661,953

(22) PCT Filed: Sep. 1, 2005

(86) PCT No.: PCT/JP2005/015992
§ 371 (c)(1), (2), (4) Date: Jan. 16, 2008

(87) PCT Pub. No.: WO2006/025483
PCT Pub. Date: Mar. 9, 2006

(65) Prior Publication Data
US 2008/0185433 A1 Aug. 7, 2008

(30) Foreign Application Priority Data

Sep. 3, 2004 (JP) ................................. 2004-257626
Apr. 22, 2005 (JP) ................................. 2005-125050

(51) Int. Cl.
*H04M 1/00* (2006.01)
(52) U.S. Cl. .... 455/558; 455/566; 455/41.2; 455/414.1; 455/418; 455/466; 455/344
(58) Field of Classification Search ........................ None
See application file for complete search history.

(56) References Cited

U.S. PATENT DOCUMENTS

| | | | |
|---|---|---|---|
| 6,292,668 B1 * | 9/2001 | Alanara et al. | 455/466 |
| 6,859,650 B1 * | 2/2005 | Ritter | 455/406 |
| 7,269,445 B2 * | 9/2007 | Natsuno et al. | 455/558 |
| 7,606,533 B2 * | 10/2009 | Perttila et al. | 455/41.2 |
| 2002/0194474 A1 | 12/2002 | Natsuno et al. | |
| 2004/0180657 A1 * | 9/2004 | Yaqub et al. | 455/435.1 |

FOREIGN PATENT DOCUMENTS

| | | |
|---|---|---|
| GB | 2396530 A | 6/2004 |
| JP | 2002-216081 | 8/2002 |

(Continued)

OTHER PUBLICATIONS

Japanese Office Action issued on corresponding JP Application No. 2005-125050.

(Continued)

*Primary Examiner* — Willie J Daniel, Jr.
(74) *Attorney, Agent, or Firm* — MKG, LLC

(57) ABSTRACT

A mobile terminal is provided which is capable of managing contact-less card function content, while acquiring and deleting the contact-less card function content with ease. The mobile terminal according to the present invention has a terminal operating system (OS) that executes various functions of the mobile terminal, a Felica application manager (FAM), a Felica device driver that drives a Felica OS according to control of the FAM, and a Felica chip that stores Felica content. The FAM operates a Java applications manager that manages Java applications having the network computing function, API to start a browser, that executes API, and other applications such as a the browser, a menu and a Felica viewer.

10 Claims, 13 Drawing Sheets

FOREIGN PATENT DOCUMENTS

| | | |
|---|---|---|
| JP | 2003-076958 | 3/2003 |
| JP | 2004-038657 | 2/2004 |
| JP | 2004-192289 | 7/2004 |
| JP | 2004-214994 | 7/2004 |
| JP | 2005-202856 | 7/2005 |
| KR | 2002-0077615 | 10/2002 |
| TW | 387190 B | 4/2000 |
| WO | 02061572 | 8/2002 |

OTHER PUBLICATIONS

Unexamined JP patent publication No. JP2002-140665 (with English Abstract).
Nikkei Communications vol. 417, pp. 99-101(Jun. 28, 2004).
Business Communication vol. 41, pp. 110-111 (Jul. 1, 2004).
Telecommunication vol. 21-8, pp. 30-35 (Jul. 25, 2004).
Supplementary European Search Report dated Oct. 10, 2011.

* cited by examiner

| APPLICATION | SERVICE | REGISTRATION DATE | DELETION DATE | DELETION URL | AREA |
|---|---|---|---|---|---|
| $\alpha_1$ | SERVICE 1 | 1/16 | | http://··· | COMMON |
| $\alpha_2$ | SERVICE 2 | 3/7 | 5/20 | http://··· | PUBLIC |
| $\alpha_3$ | SERVICE 3 | 6/25 | | http://··· | FREE |
| ⋮ | ⋮ | ⋮ | ⋮ | | |
| ⋮ | ⋮ | ⋮ | ⋮ | | |

| APPLICATION | SERVICE | REGISTRATION DATE | DELETION DATE | DELETION URL | AREA | USER ID | PASSWORD |
|---|---|---|---|---|---|---|---|
| $\alpha_1$ | SERVICE 1 | 1/16 | | http://… | COMMON | ABC… | ○○○○ |
| $\alpha_2$ | SERVICE 2 | 3/7 | 5/20 | http://… | PUBLIC | XYZ… | ○○○○ |
| $\alpha_3$ | SERVICE 3 | 6/25 | | http://… | FREE | ABC… | ○○○○ |
| … | … | … | … | | | | |
| … | … | … | … | | | | |

FIG.17

MOBILE TERMINAL DEVICE, CONTACT-LESS CARD FUNCTION MANAGEMENT SYSTEM AND CONTACT-LESS CARD FUNCTION ACQUISITION SYSTEM

FIELD OF THE INVENTION

The present invention relates to a mobile terminal device, contact-less card function management system and contact-less card function acquisition system, and more particularly, to a mobile terminal device, contact-less card function management system and contact-less card function acquisition system enabling easy management and acquisition of the contact-less card function.

RELATED BACKGROUND ART

In recent years, IC cards have become widespread such that an IC is embedded in a plastic card. The IC card can be installed with various functions of a variety of cards such as a credit card and a debit card. Techniques have been developed for installing the IC card functions in a mobile terminal device.

In a mobile terminal device installed with the IC card functions, it is possible to select a desired IC card function on a display screen of the device corresponding to user operation. When a user selects a desired IC card function on the display screen to execute, an application corresponding to the IC card function is initiated to execute the IC card function.

In such a mobile terminal device, however, it is necessary to always initiate an application corresponding to the IC card function in executing processing on the IC card function such as acquisition processing and deletion processing, thus resulting in the necessity for complicated operation. Further, under present circumstances, a list of titles of all the IC card functions is only displayed in viewing the IC card function on a mobile terminal device, and overall management of the IC card functions is not performed.

Further, when the list of the IC card functions is displayed on a display screen of the mobile terminal device, information in applications corresponding to the IC card functions has currently been referred to. Therefore, if information of an IC card function can technically be acquired directly from an external device such as a reader/writer (R/W), there is no means for incorporating the information of such a function in the displayed list of IC card functions. Such inconvenience is based on the fact that access is only allowed from a predetermined application corresponding to the IC card function due to mechanisms of currently popularized mobile terminal devices. Such limitation is, however, necessary to maintain security of IC card functions and information related to the functions. Accordingly, even information stored in the same storage area on an IC card is not shared by IC card functions under any circumstances, and therefore, it is impossible to collectively manage a plurality of pieces of information of IC card functions stored in the storage area.

An object of the present invention is to provide a mobile terminal device, contact-less card function management system and contact-less card function acquisition system enabling overall management of contact-less card function content and further enabling acquisition and deletion of the contact-less card function content to be carried out with ease.

SUMMARY OF THE INVENTION

In the conventional techniques, since only an application corresponding to a contact-less card function is capable of controlling the contact-less card function, when registering contact-less card function content, it is indispensable to register the contact-less card function content with an application corresponding to the content. Further, when registration is not made with the application corresponding to the contact-less card function content, even if the contact-less card function content is actually stored in a mobile terminal device, the description of the content cannot be incorporated in a displayed list.

Therefore, the inventors of the present invention noted that an operating system for contact-less card function executes the contact-less card function, while a terminal operating system executes the other functions. It was determined that by providing a manager capable of controlling the contact-less card function and the other functions (native functions) such as, for example, a browser function, menu function and viewer function installed in a mobile terminal, it is possible to manage contact-less card function content, while performing acquisition and deletion of the contact-less card function content with easy operation, and to incorporate the description of the contact-less card function content in the displayed list, and have reached the present invention.

The present invention is directed in one aspect to providing a contact-less card function controller that performs control of acquisition and deletion of contact-less card function content via an application that provides the contact-less card function content, while further performing control of acquisition of contact-less card function content from an external acquirer, thereby managing the contact-less card function content, while acquiring and deleting the contact-less card function with easy operation, and incorporating descriptions of the contact-less card function content in the displayed list.

A mobile terminal device of the present invention has a device body, a device operating system that operates various functions used in the device body, a contact-less card storage that stores contact-less card function content, and a contact-less card function controller that performs control to use the contact-less card function content using the various functions.

According to this embodiment, the contact-less card function controller is capable of managing the contact-less card function content, and thereby using the contact-less card function content using various functions. As a result, a user is capable of using the contact-less card function content with ease. For example, a user can easily recognize the content on a display screen.

A mobile terminal device of the present invention has a device body, a contact-less card storage that stores contact-less card function content, a contact-less card function controller that performs control to use the contact-less card function content, and an acquirer that directly acquires the contact-less card function content, where the contact-less card function controller performs control of acquisition and deletion of the contact-less card function content via an application that provides the contact-less card function content, while further performing control of acquisition of the contact-less card function content via the acquirer.

According to this embodiment, it is possible to perform control of acquisition of contact-less card function content either via the application or from a reader/writer without accessing the application. A user is thereby capable of acquiring and/or deleting the contact-less card function content with ease.

In the mobile terminal device of the present invention, the contact-less card function controller preferably has an association table that associates the contact-less card function content with the application that provides the contact-less card function content.

According to this embodiment, the device has the association table that associates the contact-less card function content with the application that provides the content, and it is thus possible to manage the contact-less card function content. By this means, it is possible to display the contact-less card function content in the contact-less card storage for each storage area in the storage. Further, since the association table enables the contact-less card function content to be managed for each storage area, it is possible to recognize the capacity of contact-less card function content for each storage area.

In the mobile terminal device of the present invention, it is preferable that the association table has a deletion URL for each piece of the contact-less card function content used in deleting the contact-less card function content, and that the contact-less card function controller requests the deletion URL in deleting the contact-less card function content on a display screen when the viewer function is used.

According to this embodiment, since the association table manages the deletion URL, it is possible to delete the contact-less card function content at a link of the deletion URL without initiating an application of a content provider that provides the contact-less function card content.

In the mobile terminal device of the present invention, the contact-less card function controller preferably updates the contact-less card function content in the association table when new contact-less card function content is added to the contact-less card storage.

According to this embodiment, since information related to newly added contact-less card function content is updated in the association table when the content is added, it is possible to manage the newly added contact-less card function content.

In the mobile terminal device of the present invention, the contact-less card storage preferably has a plurality of areas to store the contact-less card function content.

According to this embodiment, by dividing the storage into a plurality of areas, it is possible to manage the contact-less card function content, for example, based on the category, service level and security level.

In the mobile terminal device of the present invention, it is preferable that the various functions include a viewer function, and that the contact-less card function controller displays the contact-less card function content for each of the plurality of areas in the storage using the viewer function.

According to this embodiment, it is possible to display the contact-less card function content in the contact-less card storage to be easily viewable to a large extent for each storage area. As a result, a user is capable of recognizing the description and/or state of the contact-less card function content with ease for each storage area.

In the mobile terminal device of the present invention, the contact-less card function controller preferably deletes the contact-less card function content on the display screen in using the viewer function.

According to this embodiment, since the contact-less card function content can be deleted on the screen without initiating the application, it is possible to delete the contact-less card function content with ease. The user operation, and user convenience is improved.

A contact-less card function management system of the present invention has the mobile terminal device as described above, and a contact-less card function content server which is connected to the mobile terminal device via a network, and stores a plurality of pieces of contact-less card function content obtained from providers that provide the contact-less card function content.

According to this embodiment, the mobile terminal device is capable of managing the contact-less card function content, while deleting and/or acquiring contact-less card function content readily, whereby it is possible to achieve a system enabling acquisition and deletion of the contact-less card function content to be carried out with easy user operation.

A contact-less card function acquisition system of the present invention has a mobile terminal device, and a server of a provider that is connected to the mobile terminal device via a network that provides contact-less card function content. The mobile terminal device has a device body, a contact-less card storage that stores the contact-less card function content, a contact-less card function controller that performs control to use the contact-less card function content, and an acquirer that directly acquires the contact-less card function content. When the contact-less card function content is acquired via the acquirer, the contact-less card function controller acquires content information related to the acquired contact-less card function content from the server.

According to this embodiment, the content information related to the newly acquired contact-less card function content is acquired from the server when the content is directly acquired from the outside, whereby it is possible to manage the contact-less card function content acquired from the outside in the same way as in the contact-less card function content acquired through activation of the application.

According to the present invention, the contact-less card function controller is provided which performs control of acquisition and deletion of the contact-less card function content via an application that provides the contact-less card function content, while further performing control of acquisition of the contact-less card function content from the external acquirer, and it is thus possible to manage the contact-less card function content, and to perform acquisition and deletion of the contact-less card function control with ease operation.

BRIEF DESCRIPTION OF THE DRAWINGS

FIG. 17 is a diagram illustrating another example of the association table that associates contact-less card function content with an application that provides the contact-less card function content.

DESCRIPTION OF THE PREFERRED EMBODIMENTS

An embodiment of the present invention will be specifically described below with reference to accompanying drawings.

Figure 1:
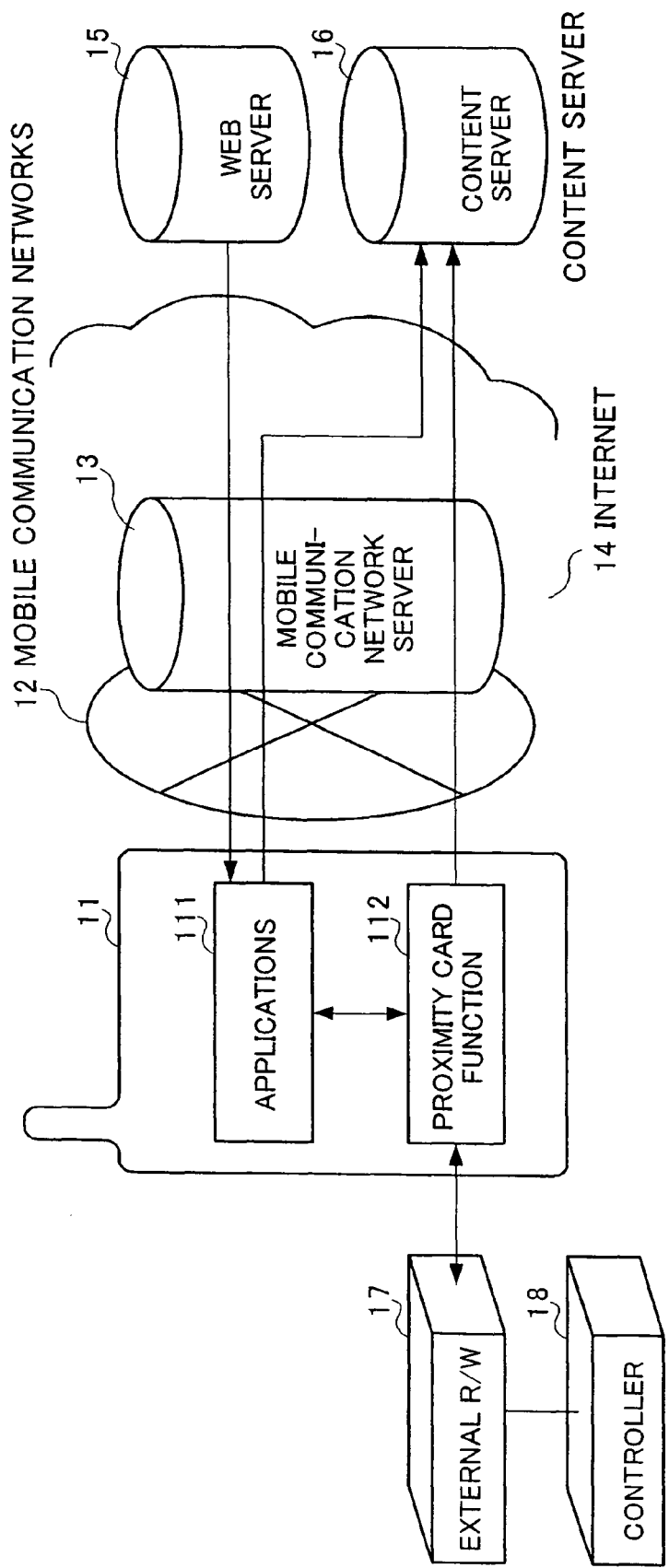
FIG. 1 is a diagram illustrating a schematic configuration of a contact-less card function management system and a contact-less card function acquisition system according to one embodiment of the present invention.

FIG. 1 is a diagram illustrating a schematic configuration of a contact-less card function management system and a contact-less card function acquisition system according to one embodiment of the present invention.

The system as shown in FIG. 1 is mainly comprised of a mobile terminal 11 according to the present invention, a mobile communication network server 13 connected to the mobile terminal 11 via mobile communication networks 12, and a Web server 15 and a contact-less card function content server 16 each connected to the mobile terminal 11 via a network such as the internet 14.

The mobile terminal 11 is provided with functions for executing various applications 111 and contact-less card function 112. The mobile terminal 11 is further provided with a reader/writer (not shown) that is an acquirer capable of transmitting/receiving information to/from an external reader/writer (R/W) 17. In addition, a controller 18 drives the external reader/writer 17.

The contact-less card function 112 in the mobile terminal 11 represents a function of acquiring and deleting a contact-less card, for example, contact-less IC card function content, and includes, for example, Felica (Trademark). In order to implement the contact-less card function 112, the mobile terminal 11 is installed with a storage area that stores the content and an operation system (controller) for the contact-less card function.

Mobile communication networks 12 are networks between the mobile terminal 11 and mobile communication network server 13, and include a mobile packet communication network, as well as a general mobile communication network. The mobile communication network server 13 is, for example, an i mode (Trademark) server, serves a gateway function of connecting the mobile communication networks 12 and the internet 14, and more specifically, has the information distribution function, mail transmission/reception function, mail storage function, contract customer management function, information provider management function and information fee charging function.

The networks include the Internet 14 and other networks such as, for example, LAN and WAN. The Web server 15 is a server on the Internet 14 that stores the applications 111 to download to the mobile terminal 11.

The content server 16 stores respective pieces of contact-less card function content provided from a plurality of provides each providing the contact-less card function content, while performing acquisition and deletion of the contact-less card function content, initialization and data read and write, with the controller that implements the contact-less card function via networks. The content server 16 is further provided with an application for the server 16 to perform processing on the controller that implements the contact-less card function. In addition, a service provider may have the content server on the Internet 14 together with the Web server, or the content server may be on another network other than the Internet 14 separately from the Web server of a service provider. For example, when the contact-less card function is Felica, the content server 16 is a Felica server.

In the system with the aforementioned configuration, the mobile terminal 11 controls acquisition and deletion of contact-less card function content via the application that provides the contact-less card function content, while controlling acquisition of contact-less card function content acquired via the R/W. Thus, it is possible to control acquisition of contact-less card function content either via the application or via the R/W without through the application, and a user is thereby capable of acquiring and deleting the contact-less card function content with easy operation.

In the mobile terminal 11, when acquisition and deletion of contact-less card function content is controlled via the application 111 that provides the contact-less card function content, the contact-less card function 112 is accessed using the application 111, for example, an i appli (Trademark) of the mobile terminal 11. Then, the contact-less card function content is acquired or deleted on the application 111.

In the mobile terminal 11, when acquisition of contact-less card function content is controlled via the R/W, the contact-less card function content is directly acquired from the external R/W 17 without through the application 111. At this point, the terminal 11 acquires the content information related to the acquired contact-less card function content from the Web server 15.

In addition, in the system with the aforementioned system, it is possible to carry out information distribution, mail transmission/reception, mail storage, contract customer management, information provider management and information fee charging, but for the sake of simplicity, the specific procedures or the like is not described herein.

Figure 2:
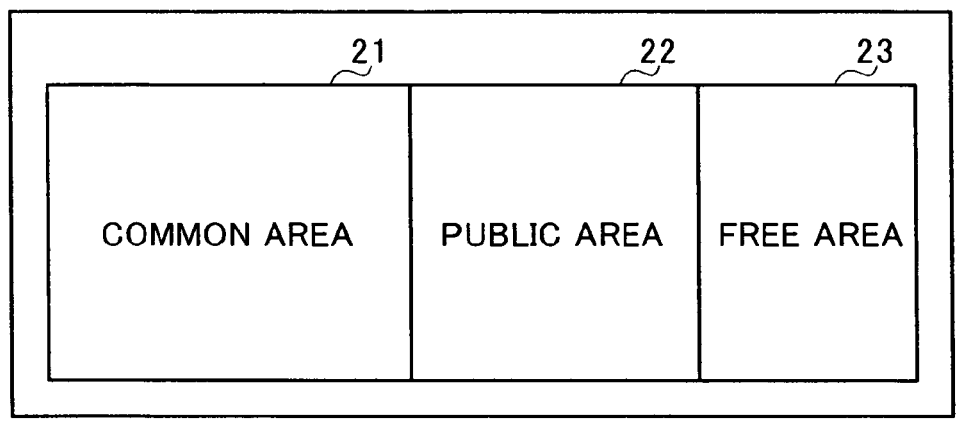
FIG. 2 is a diagram illustrating a configuration of a storage area that stores contact-less card function content in a mobile terminal device according to the embodiment of the present invention.

FIG. 2 is a diagram illustrating a configuration of a storage area that stores the contact-less card function content in the mobile terminal device according to the embodiment of the present invention. For example, when the contact-less card function is Felica, the storage area is a Felica chip. The storage area is comprised of, for example, a common area 21, public area 22 and free area 23. These areas are sorted, for example, by the category, difference in service level and degree of security of the contact-less card function content. For example, the common area 21 and public area 22 are set as areas that store pieces of contact-less card function content with relatively high service level and high security service, while the free area 23 is set as an area that stores pieces of contact-less card function content with relatively low service level and low security service. In addition, the storage areas and the category, service level or security is capable of being varied as appropriate. By thus sorting the storage areas with the category, service level, security or the like, it is possible to manage the contact-less card function content for each of the category, service level and security level.

Figure 3:
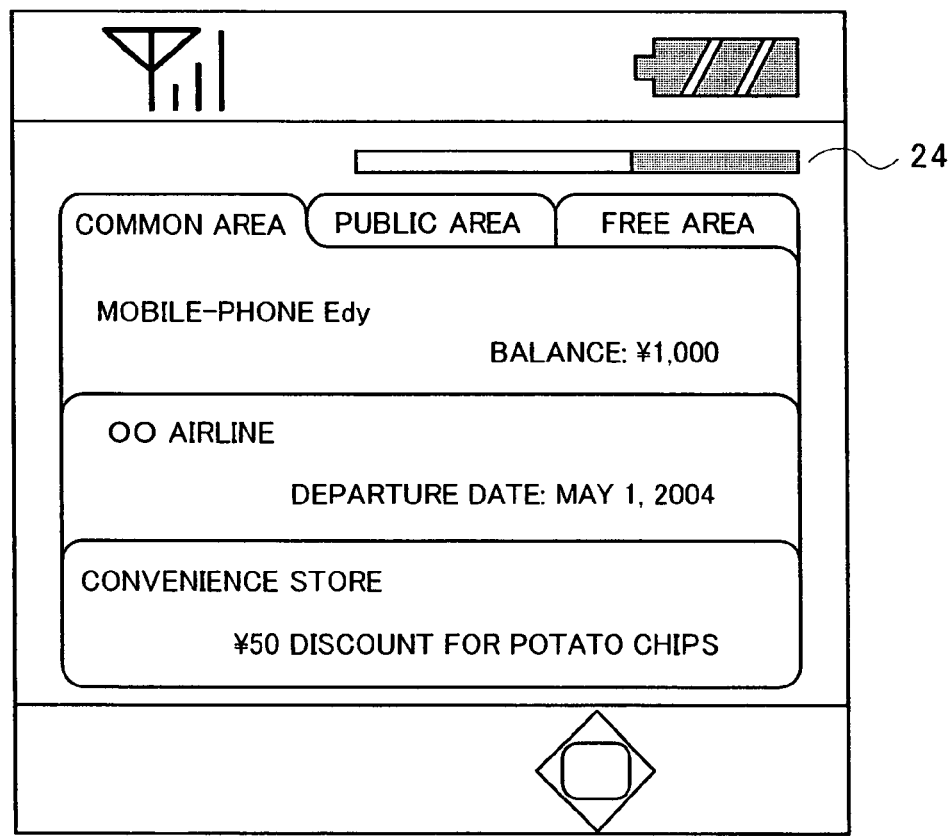
FIG. 3 is a diagram illustrating contact-less card function content in a common area on a display screen in the mobile terminal device.
Figure 4:
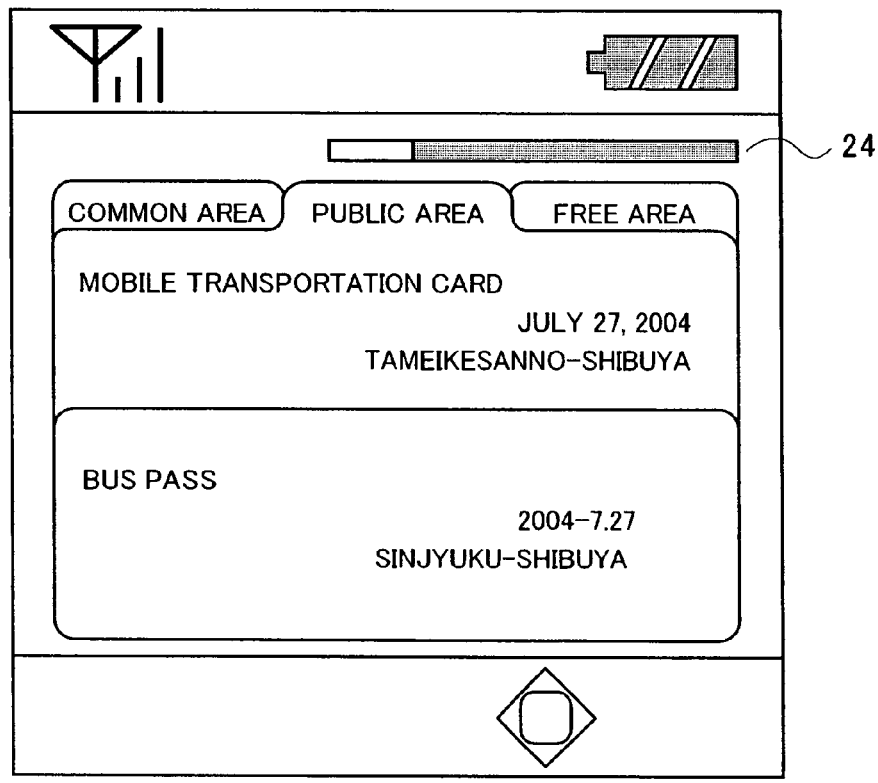
FIG. 4 is a diagram illustrating contact-less card function content in a public area on the display screen in the mobile terminal device.
Figure 5:
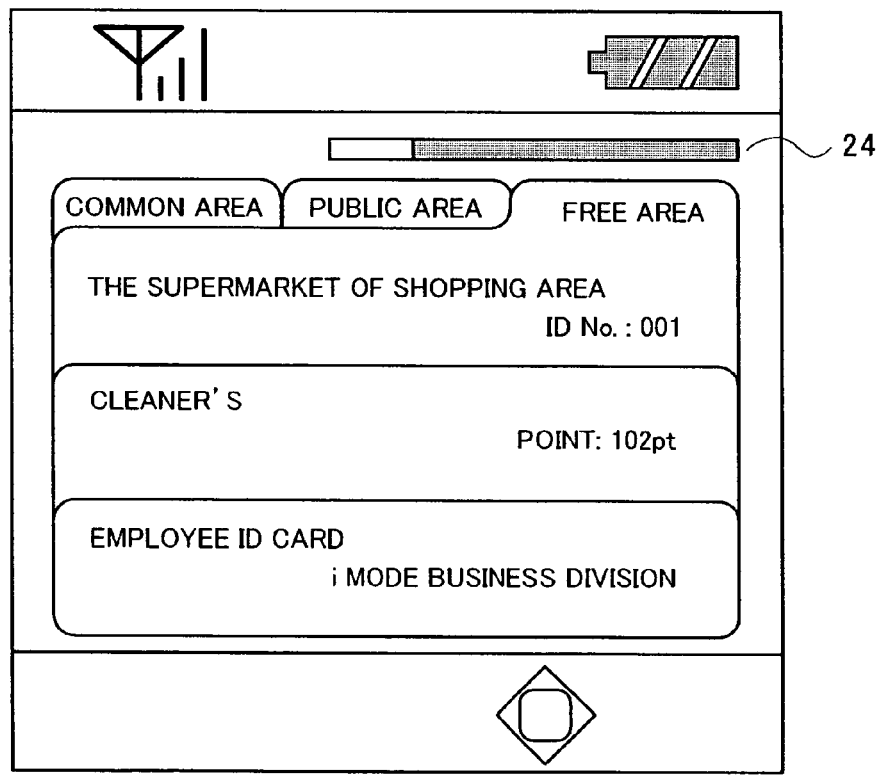
FIG. 5 is a diagram illustrating contact-less card function content in a free area on the display screen in the mobile terminal device.

Pieces of contact-less card function content stored in the common area 21, public area 22 and free area 23 are collectively displayed in each area as shown in FIGS. 3 to 5. FIG. 3 is a diagram illustrating contact-less card function content in the common area 21 on the display screen of the mobile terminal device 11, FIG. 4 is a diagram illustrating contact-less card function content in the public area 22 on the display screen of the mobile terminal device 11, and FIG. 5 is a diagram illustrating contact-less card function content in the free area 23 on the display screen of the mobile terminal device 11. In addition, each service as shown in FIGS. 3 to 5 is of the contact-less card function content provided from the service provider.

In FIGS. 3 to 5, on the display screen is displayed an indicator 24 that indicates a remaining capacity of each area. The remaining capacity in each area may be indicated using the indicator 24 as shown in FIGS. 3 to 5. Otherwise, it may be possible beforehand setting the number of storable pieces of content, and displaying a set number of content display areas (three areas in FIG. 3, two areas in FIG. 4 and three areas in FIG. 5), while displaying a non-used content display area as a blank. By providing such an indicator or blank content display area, a user is capable of visually recognizing the remaining capacity for each of the storage areas.

Further, in newly acquiring the contact-less card function content, the capacity of the content may be compared with the remaining capacity of an area to store the content, and when the capacity of the content exceeds the remaining content, a message may be displayed indicative of lack of the capacity or the need of deleting the already stored contact-less card storage content. By displaying such a message, a user is capable of recognizing the need of deletion of contact-less card function content.

Figures 6, 7:
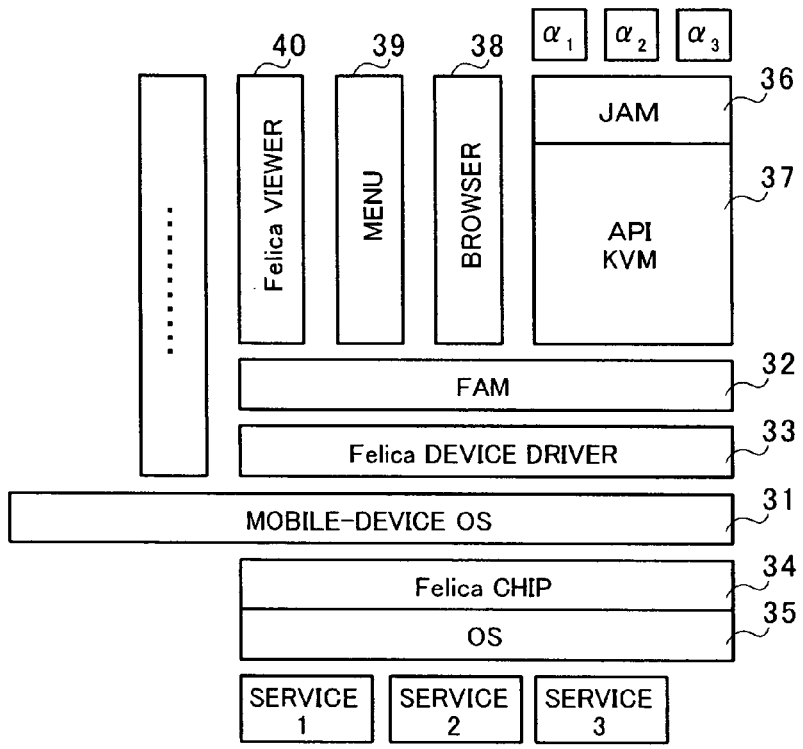
FIG. 6 is a diagram illustrating an internal configuration of the mobile terminal device according to the embodiment of the present invention.
FIG. 7 is a diagram illustrating an association table that associates contact-less card function content with an application that provides the contact-less card function content.

FIG. 6 is a diagram illustrating an internal configuration of the mobile terminal 11 according to the one embodiment of the present invention. In FIG. 6, a case is described where the contact-less card function is Felica, the storage area is a Felica chip, and an operation system (controller) for the contact-less card function is a Felica operation system (Felica OS).

The configuration as shown in FIG. 6 primarily has a terminal operation system (mobile-device OS) 31 that executes various functions of the mobile terminal 11, a Felica application manager (FAM) 32 that is the contact-less card function controller, a Felica device driver 33 that drives the Felica OS 35 according to the control of the FAM 32, and a Felica chip 34 that stores Felica content. On the FAM 32 operate a Java (Trademark) application manager (JAM) 36 that manages Java applications having the network computing function, API (Application Program Interface) to start up a browser and KVM (K Virtual Machine) 37 that is a device to execute API, and other applications i.e. the so-called native functions such as the browser 38, menu 39 and Felica viewer 40. In addition, in FIG. 6, the browser 38, menu 39 and Felica viewer 40 operate on the FAM 32, but this embodiment is one example. Functions such as the browser 38 and menu 39 except the Felica viewer 40 may be configured to operate also on the mobile-device OS 31, while operating on the FAM 32.

The mobile-device OS 31 executes functions other than functions related to Felica such as the information distribution function, mail transmission/reception function, mail storage function, contract customer management function, information provider management function and information fee charging function.

The FAM 32 is middleware that performs control to use Felica content according to the present invention. In particular, the FAM 32 performs access control to readily acquire contact-less card function content from the external R/W, manages the acquired Felica content, and issues commands to execute the browser 38, menu 39 and Felica viewer 40. By this means, the FAM 32 is capable of managing the Felica content, and using the Felica content using the functions of the browser 38, Felica viewer 40 and so on. As a result, a user is capable of using the Felica content with ease, for example, displaying the content on the display screen.

To manage the acquired Felica content, the FAM 32 has an association table that associates the Felica content with an application (i appli (Trademark)) that provides the Felica content. The association table is, for example, as shown in FIG. 7, and associates services 1 to 3 that are pieces of Felica content with i appli $\alpha_1$ to $\alpha_3$ of service providers that provide the services 1 to 3, respectively. Further, in the association table are managed a date (registration date) when Felica content was acquired and a date (deletion date) when Felica content was deleted. Furthermore, in the association table are managed a URL (deletion URL) of a site to actually delete Felica content, and an area in the Felica chip 34. Thus, since the FAM 32 manages the Felica content, for example, it is possible to manage pieces of Felica content in association with each category on the Felica chip 34. In this way, by providing the mobile terminal 11 with the FAM 32, a plurality of pieces of Felica content is allowed to be grouped corresponding to categories, and display control can be performed to be easily viewable to a user.

Accordingly, when Felica content is acquired, i.e. new Felica content is added, the service provider is registered with an item of the application, and the description is registered with an item of service. Further, a date that the content is registered is registered with the registration date. Furthermore, a deletion URL for use in deleting the Felica content is further registered. At this point, there are no particular limitations in matters to register with items of the application and service. By thus updating the information in the association table when the new Felica content is acquired, it is possible to manage the newly Felica content.

In the case of adding Felica content via the application, when updating the association table, the content information such as a service name is acquired via the application, and using the content information, the association table is updated. Meanwhile, in the case of acquiring Felica content from the external R/W 17, when updating the association table, for example, the content information is stored at a predetermined address in the Felica chip 34, and at the time of some user operation, the FAM 32 extracts the new content information from the address and updates the association table. In addition, in the case of acquiring Felica content from the external R/W 17, a method of updating the association table is not limited particularly.

Meanwhile, in the case of deleting Felica content, a deletion URL is referred to which is associated with an application or service corresponding to the Felica content to be deleted. At this point, a date that the content is deleted is updated in the deletion date. The association table is further used in displaying content for each area using the Felica viewer 40 as shown in FIGS. 3 to 5. In other words, when displaying the content using the Felica viewer 40 as shown in FIGS. 3 to 5, the FAM 32 starts up the Felica viewer 40, and refers to the association table. By this means, it is possible to perform very easily viewable display for each area as shown in FIGS. 3 to 5. As a result, it is possible for a user to recognize the description and state of the Felica content for each area with ease.

In this way, the FAM 32 has the association table as shown in FIG. 7, and thereby is capable of managing the Felica content. By this means, for example, it is possible to display Felica content of each area in the Felica chip 34 as shown in FIGS. 3 to 5. Further, since using the association table enables the Felica chip 34 to be managed for each area, for example, by managing the remaining capacity for each area of the Felica chip 34 using the association table, it is possible to manage the capacity of the Felica chip 34 for each area. Furthermore, managing the deletion URL in the association table enables the content to be deleted at the link of the deletion URL with out initiating the i appli.

The FAM 32 performs control of acquisition and deletion of Felica content via an application that provides the Felica content i.e. starting up the i appli, while performing control of acquisition of Felica content via the R/W. By thus controlling acquisition of the Felica content both through an application such as an i appli and from the R/W without through an application, a user is capable of acquiring and deleting the Felica content readily. Addition and control of the Felica content is carried out by procedures as described below.

Figure 8:
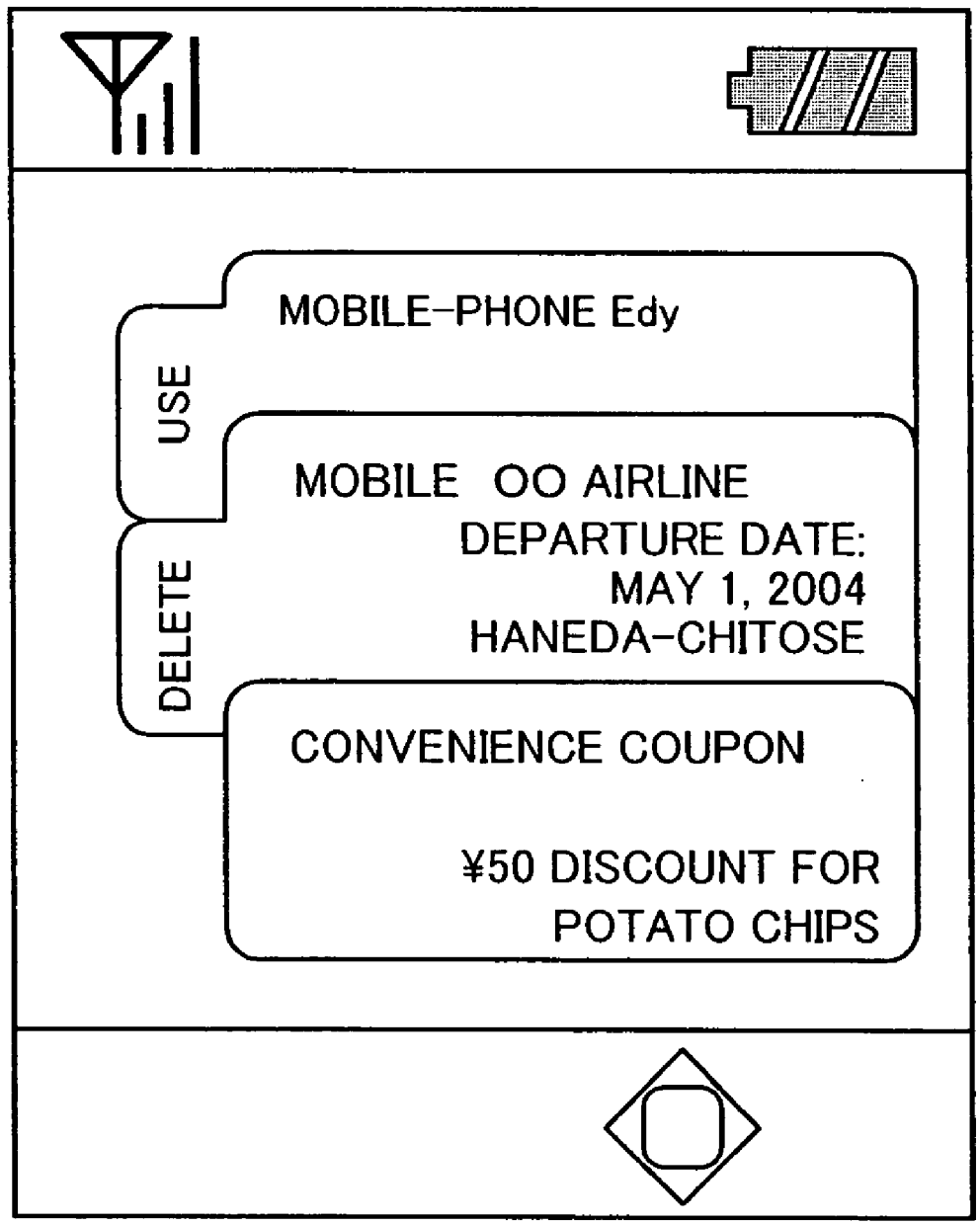
FIG. 8 is a diagram illustrating a screen where a piece of contact-less card function content in the common area is activated on the display screen in the mobile terminal device.

In the mobile terminal 11, the FAM 32 using the viewer function can carry out acquisition and deletion of the Felica content on the display screen. In this case, by selecting the common area as shown in FIG. 3 and activating a particular piece of the Felica content (in the figure, mobile ANA) in the area, tabs are displayed as shown in FIG. 8, thereby allowing selection between functions such as, for example "use" and "delete". Selecting a tab of "use" enables the use of the Felica content of mobile ANA. Meanwhile, selecting a tab of "delete" enables the Felica content of mobile ANA to be directly deleted without initiating the i appli. Descriptions of the functions displayed on tabs are not limited to the foregoing, and a provider of content is capable of setting any functions optionally, and may set other functions such as, for example, "update" and "property".

Thus, by installing the FAM 32 that is the contact-less card function controller, Felica and native functions are allowed to collaborate with each other. Therefore, only by adding Felica content to the association table on the FAM 32 in registering the Felica content, without registering the content with an application corresponding to the Felica content, the Felica content can be incorporated in a list to display. It is thus possible to prevent occurrences of such inconvenience that Felica content that is stored in the mobile terminal 11 is not incorporated in a displayed list, thereby improving user operability. For example, content stored particularly in the free area 23 may have the function of "admission card" for a specific gate. In such content, existence of the corresponding application is not indispensable, and a user uses the content in communications between the external R/W and the mobile terminal. Therefore, it is very inconvenient that content cannot be incorporated in a displayed list unless the content is registered with the corresponding application, and it is difficult to use content as such a gate admission card. By using middleware such as the FAM as in the mobile terminal device of the present invention, it is possible to save trouble of registering content with the corresponding application and the like, and improvements in operability can be expected to service providers.

Figure 9:
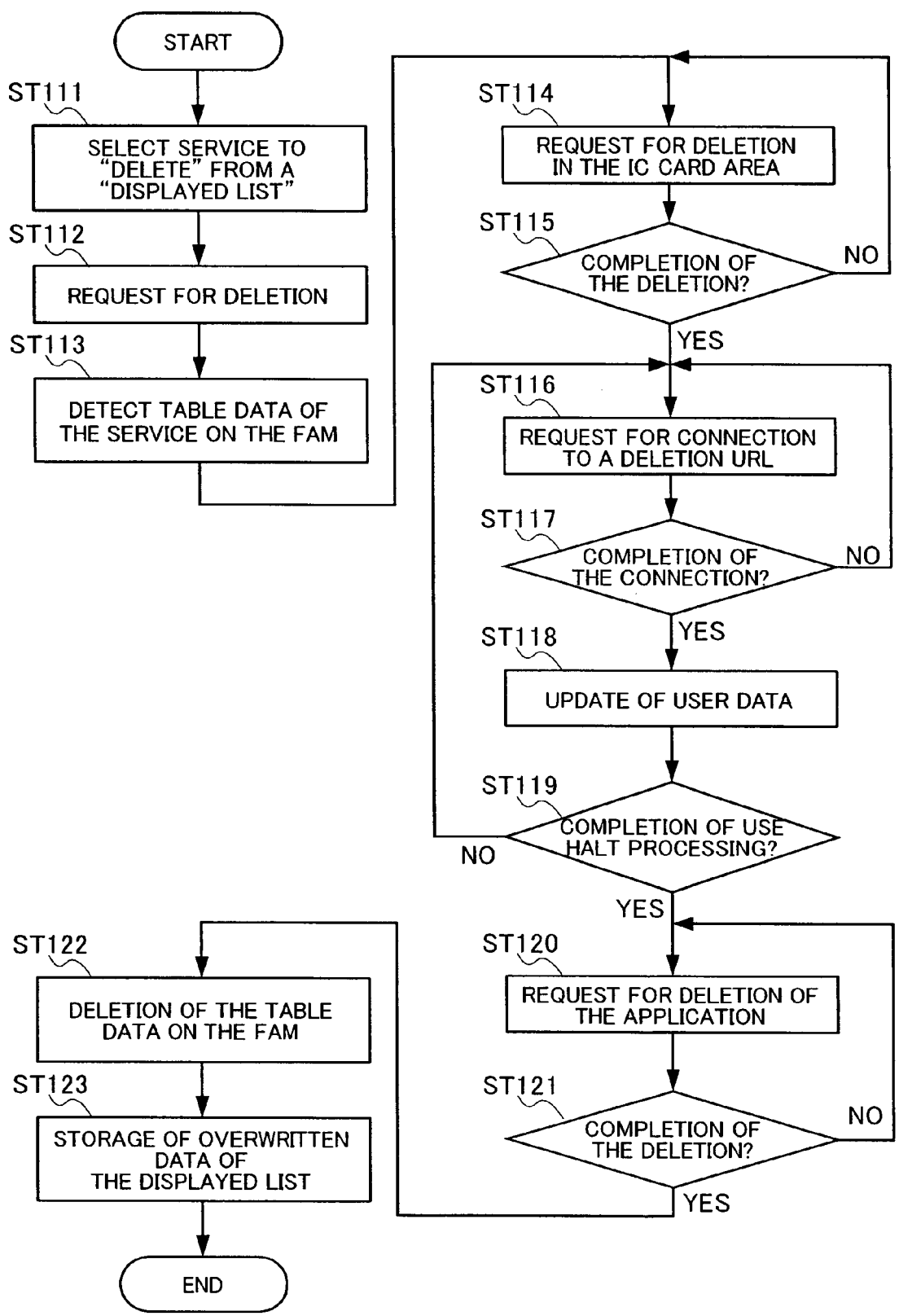
FIG. 9 is a flow diagram illustrating procedures for deleting Felica content in a mobile terminal 11.
Figure 10:
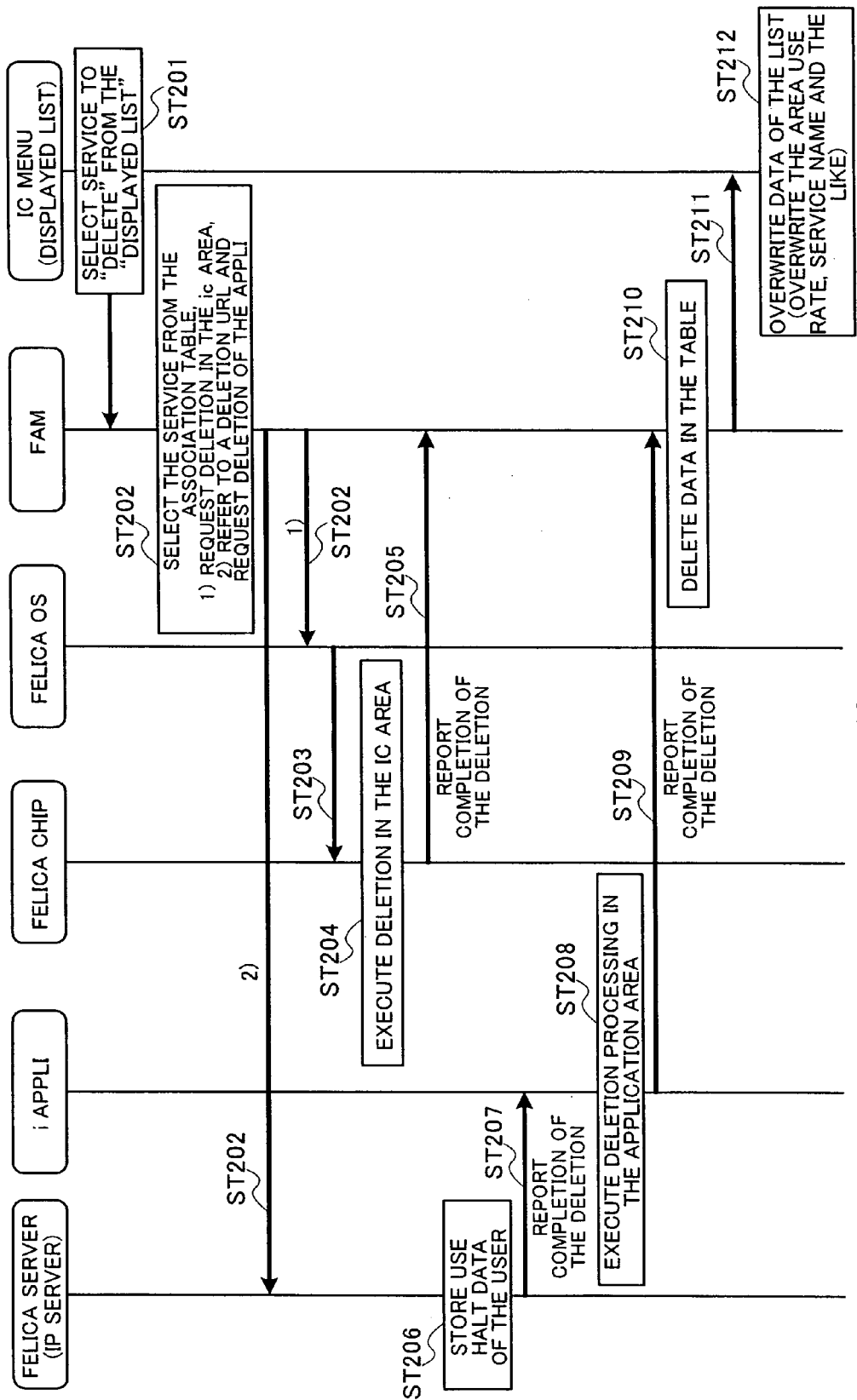
FIG. 10 is a sequence diagram illustrating procedures for deleting Felica content in the mobile terminal 11.
Figure 12:
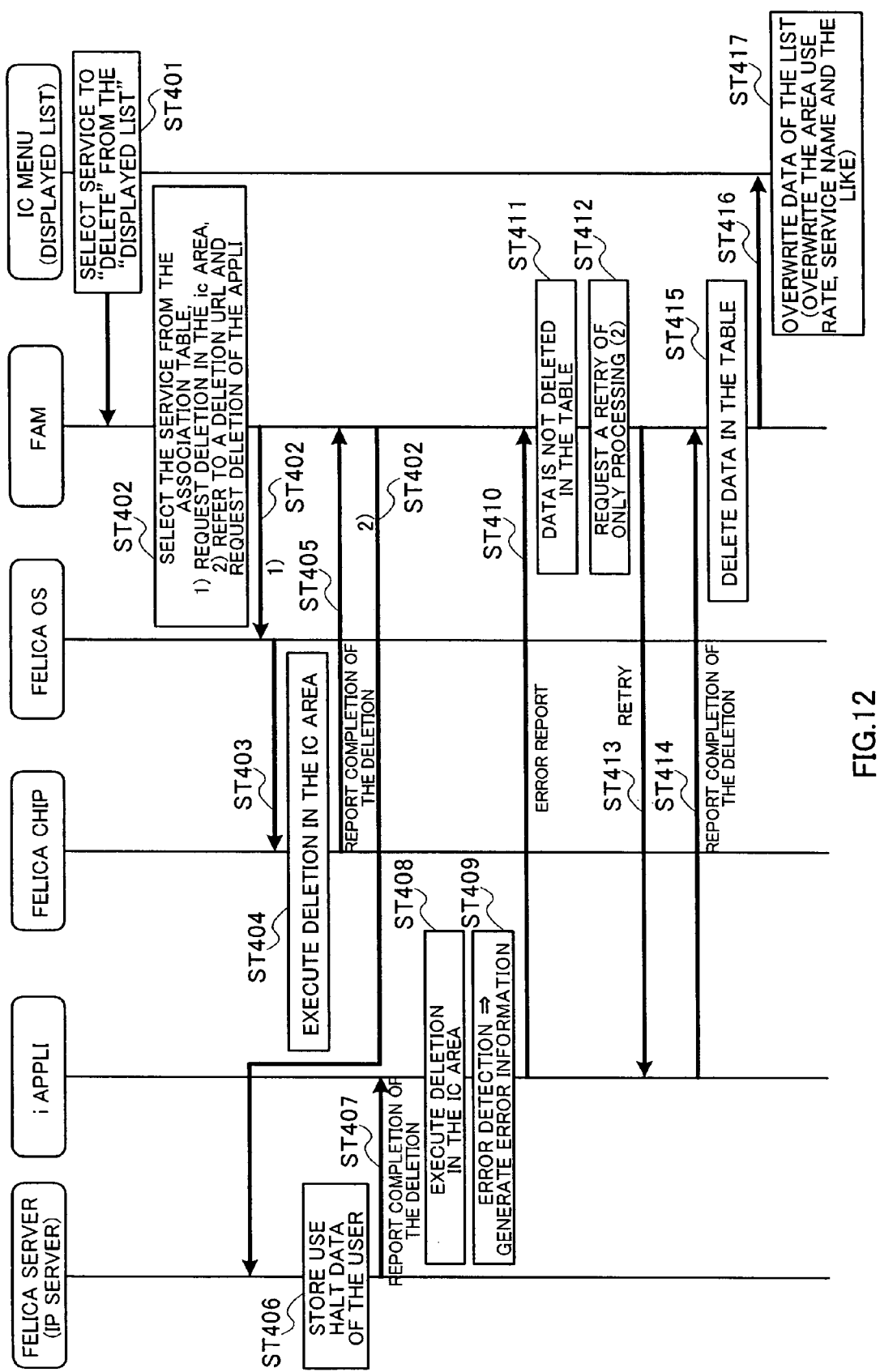
FIG. 12 is another sequence diagram illustrating procedures for deleting Felica content in the mobile terminal 11.
Figure 13:
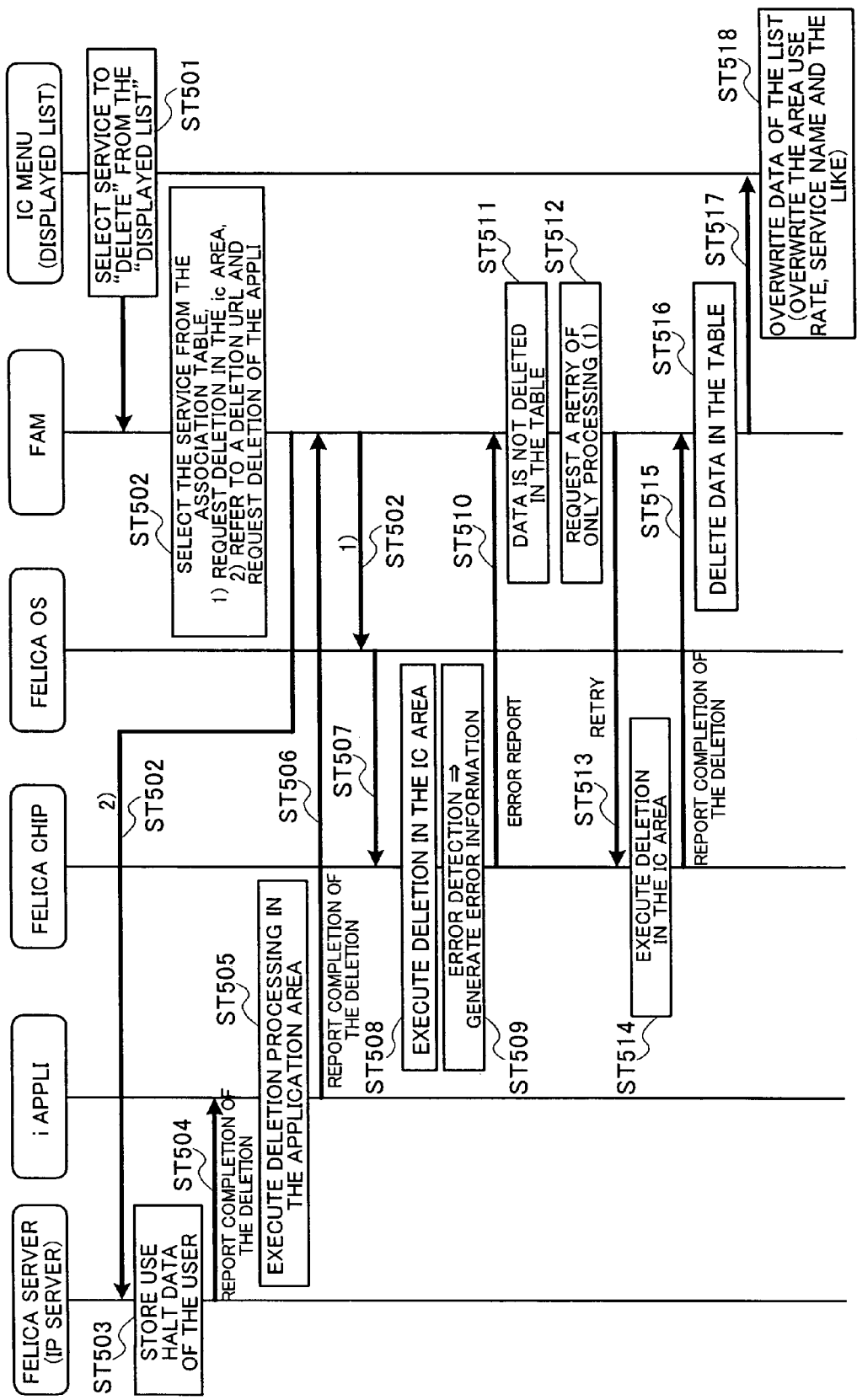
FIG. 13 is another sequence diagram illustrating procedures for deleting Felica content in the mobile terminal 11.
Figure 14:
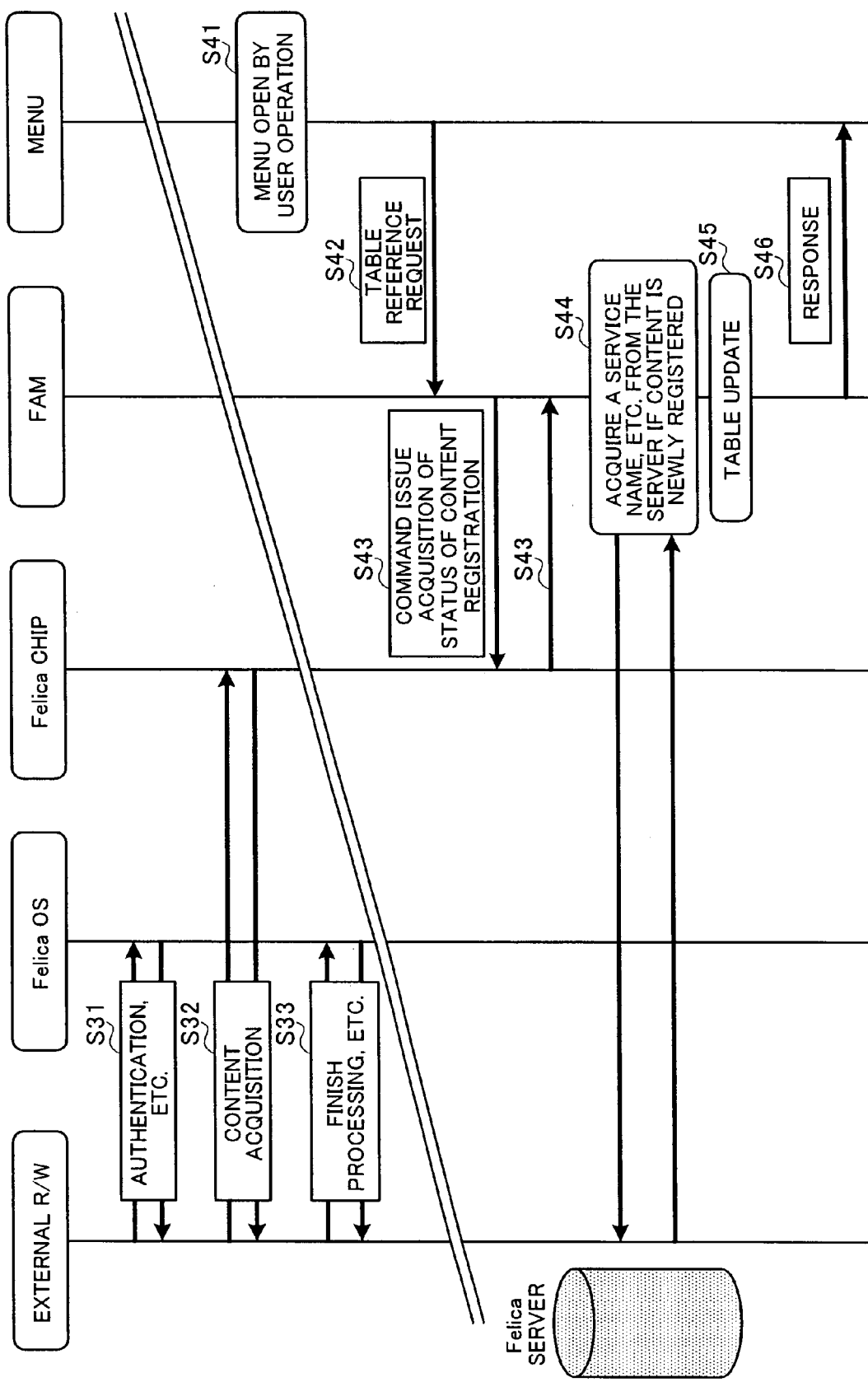
FIG. 14 is a sequence diagram illustrating procedures for acquiring contact-less card function content via R/W in the mobile terminal device.

Described below are procedures for deleting Felica content in the mobile terminal 11 and procedures for acquiring Felica content via the R/W 17. FIG. 9 is a flow diagram illustrating the procedures for deleting Felica content in the mobile terminal 11. FIGS. 10 to 13 are sequence diagrams illustrating the procedures for deleting Felica content in the mobile terminal 11. FIG. 14 is a sequence diagram illustrating procedures for acquiring Felica content via the R/W in the mobile terminal 11.

In the mobile terminal device according to the present invention, a user is capable of performing in one operation deletion of Felica content, i.e. deletion of the Felica content in the IC card area of the Felica chip 34, deletion of the Felica content in the application area, and deletion of user data in the Felica server (IP server). The need is thus eliminated for deleting the Felica content in the IC card area and the application area separately, and it is possible to delete the Felica content easily. In addition, in the sequence in this embodiment, when any one of the above-mentioned deletions is not normally finished, if data of the Felica content in the association table of the FAM 32 is deleted, data related to the Felica content is lost in the mobile terminal 11 before the Felica content is deleted normally, and therefore, the data related to the Felica content in the association table of the FAM 32 is not erased unless "complement of deletion" is reported on all the deletions. Then, a retry of the deletion processing is continued on data undergoing "error of deletion", while referring to the association table of the FAM 32.

More specifically, as shown in FIG. 9, a user selects service (Felica content) targeted for "deletion" in the mobile terminal 11 from a "displayed list" (S111). The mobile terminal 11 makes a request for deletion of the selected service (S112). Data of the service is detected from the association table of the FAM 32 (S113). Then, the mobile terminal 11 makes a request for deletion of the selected service in the IC card area on the Felica chip 34 (S114). The mobile terminal 11 determines whether the selected service is deleted in the IC card area on the Felica chip 34 (S115). When the selected service is deleted in the IC card area, a request is made for connection to a corresponding deletion URL (Felica server (IP server)) in the association table (S116). When the service is not deleted, the IC card area is requested again to delete the selected service.

Next, it is determined whether the connection to the deletion URL is completed (S117). When the connection is completed, the Felica server (IP server) updates the data so that the user cannot use the service (deletion of the i appli) (S118). Then, it is determined whether the service use halt processing is completed (S119). Meanwhile, when the connection to the deletion URL is not completed, the request for connection to the deletion URL is made again. Then, when the service use halt processing is completed, the mobile terminal 11 makes a request for deletion of the i appli (S120). When the service use halt processing not completed, the request for connection to the deletion URL is made again. When deletion of the i appli is completed, in the mobile terminal 11, data of the Felica content in the association table of the FAM 32 is deleted (S122), and data of the displayed list is overwritten and stored (S123). In addition, when deletion of the i appli is not completed, the request for deletion of the i appli is made again. In addition, in FIG. 9, since access to the Felica server is required to delete the i appli and the error occurrence rate is high, the Felica content in the IC area of the Felica chip 34 is deleted earlier, but deletion of the i appli and deletion in the IC area may be carried out in the reverse order.

Specific processing procedures of Felica content deletion processing will be described below with reference to FIGS. 10 to 13. First, referring to FIG. 10, the case will be described where all deletion processing proceeds without any problem.

First, a user selects service targeted for "deletion" in an IC menu of the mobile terminal 11 from a "displayed list" (S201). The FAM 32 thereby selects the service in the association table, 1) makes a request for deletion in the IC area on the Felica chip 34, 2) refers to a deletion URL and makes a request for deletion of the i appli to the Felica server corresponding to the deletion URL (S202). Upon receiving the request for deletion in the IC area, the Felica OS 35 executes deletion of the targeted service on the Felica chip 34 (S203 and S204). Then, the Felica chip 34 reports completion of the deletion to the FAM 32 (S205). Meanwhile, upon receiving the request for deletion of the i appli, the Felica server stores use halt data of the user (S206). Then, the Felica server reports completion of the deletion to the mobile terminal 11 (S207), and the i appli performs deletion processing in the application area (S208). The i appli reports completion of the deletion to the FAM 32 (S209). Since the service (Felica content) is deleted on the Felica chip 34 and the i appli, the FAM 32 deletes data of the targeted service in the association table (S210). Then, the information is output to the IC menu (S211), and data of the displayed list (use rate in the IC area, name of the service and like) is overwritten (S212).

Figure 11:
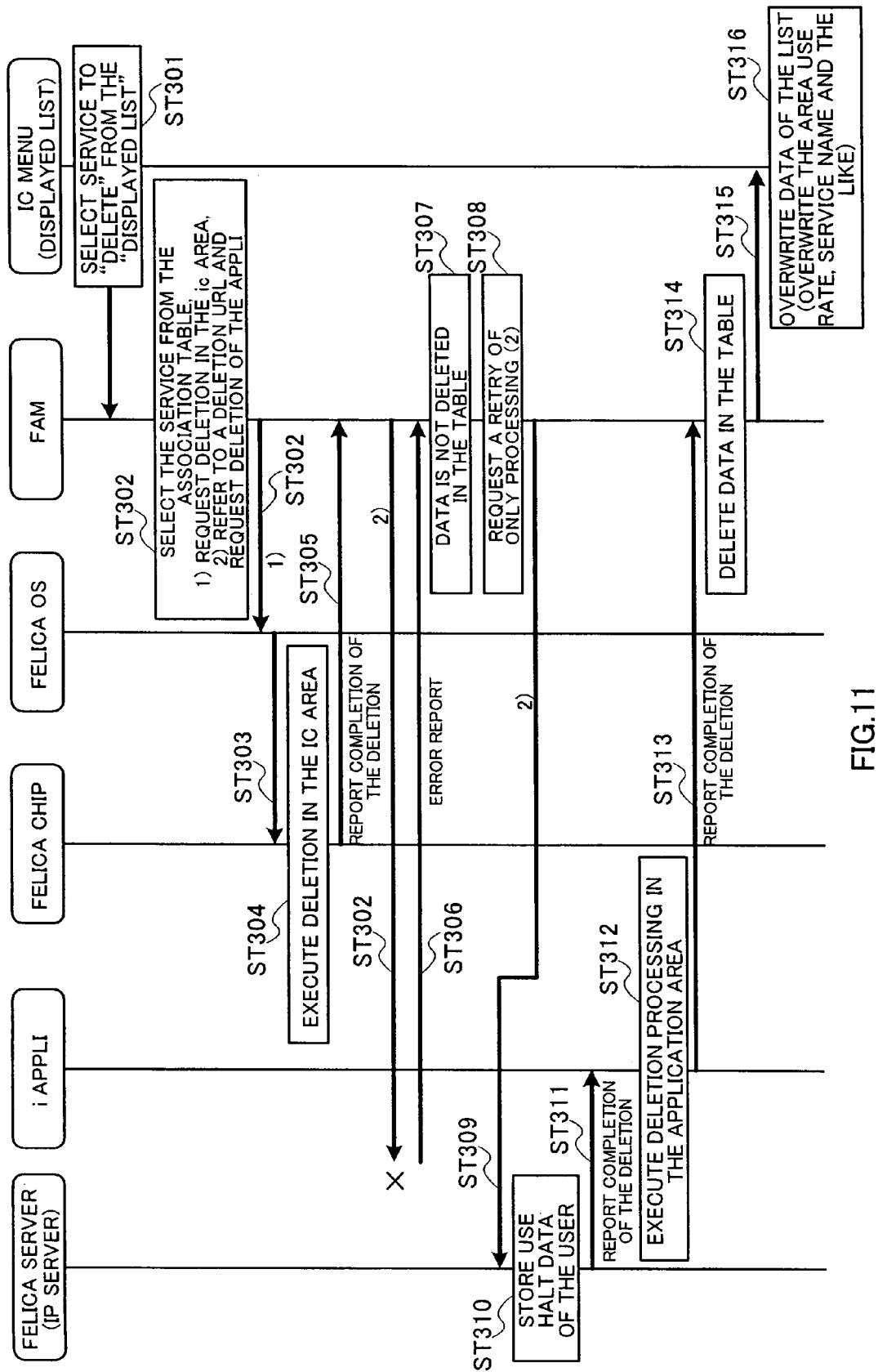
FIG. 11 is another sequence diagram illustrating procedures for deleting Felica content in the mobile terminal 11.

Described next is the case where the Felica server fails deletion processing (for example, the case where a user is out of area at the time of the deletion processing) with reference to FIG. 11. First, a user selects service targeted for "deletion" in an IC menu of the mobile terminal 11 from a "displayed list" (S301). The FAM 32 thereby selects the service in the association table, 1) makes a request for deletion in the IC area on the Felica chip 34, 2) refers to a deletion URL and makes a request for deletion of the i appli to the Felica server corresponding to the deletion URL (S302). Upon receiving the request for deletion in the IC area (S303), the Felica OS 35 executes deletion of the targeted service on the Felica chip 34 (S304). Then, the Felica chip 34 reports completion of the deletion to the FAM 32 (S305).

Meanwhile, when an error report is transmitted to the FAM 32 due to failure of the request for deletion of the i appli to the Felica server (S306), the FAM 32 does not delete the target data in the association table (S307), and only makes a request again (retry) for deletion of the i appli to the Felica server corresponding to the deletion URL (S308). In addition, the retry is repeated until the request for deletion is normally transmitted to the Felica server. Intervals of retry are not limited particularly.

Upon receiving the request for deletion of the i appli (S309), the Felica server stores use halt data of the user (S310). Then, the Felica server reports completion of the deletion to the mobile terminal 11 (S311), and the i appli performs deletion processing in the application area (S312). The i appli reports completion of the deletion to the FAM 32 (S313). Since the service (Felica content) is deleted on the Felica chip 34 and the i appli, the FAM 32 deletes data of the targeted service in the association table (S314). Then, the information is output to the IC menu (S315), and data of the displayed list (use rate in the IC area, name of the service and like) is overwritten (S316).

Next, the case of failure in deletion processing on the i appli will be described with reference to FIG. 12. First, a user selects service targeted for "deletion" in an IC menu of the mobile terminal 11 from a "displayed list" (S401). The FAM 32 thereby selects the service in the association table, 1) makes a request for deletion in the IC area on the Felica chip 34, 2) refers to a deletion URL and makes a request for deletion of the i appli to the Felica server corresponding to the deletion URL (S402). Upon receiving the request for deletion in the IC area (S403), the Felica OS 35 executes deletion of the targeted service on the Felica chip 34 (S404). Then, the Felica chip 34 reports completion of the deletion to the FAM 32 (S405).

Meanwhile, upon receiving the request for deletion of the i appli, the Felica server stores use halt data of the user (S406). Then, the Felica server reports completion of the deletion to the mobile terminal 11 (S407), and the i appli performs deletion processing in the application area (S408). At this point, when the i appli detects an error, the i appli generates error information (S409), and reports the error to the FAM 32 (S410). Upon receiving the error report, the FAM 32 does not delete the target data in the association table (S411), and only makes a request again (retry) for deletion to the i appli corresponding to the deletion URL (S412). In addition, the retry is repeated until the request for deletion on the i appli is normally transmitted. Intervals of retry are not limited particularly.

Upon receiving the request for deletion (S413), the i appli performs deletion processing, and reports completion of the deletion to the FAM 32 (S414). Since the service (Felica content) is deleted on the Felica chip 34 and the i appli, the FAM 32 deletes data of the targeted service in the association table (S415). Then, the information is output to the IC menu (S416), and data of the displayed list (use rate in the IC area, name of the service and like) is overwritten (S417).

Next, the case of failure in deletion processing on the Felica chip will be described with reference to FIG. 13. First, a user selects service targeted for "deletion" in an IC menu of the mobile terminal 11 from a "displayed list" (S501). The FAM 32 thereby selects the service in the association table, 1) makes a request for deletion in the IC area on the Felica chip 34, 2) refers to a deletion URL and makes a request for deletion of the i appli to the Felica server corresponding to the deletion URL (S502). Upon receiving the request for deletion of the i appli, the Felica server stores use halt data of the user (S503). Then, the Felica server reports completion of the deletion to the mobile terminal 11 (S504), and the i appli performs deletion processing in the application area (S505). Then, the i appli reports completion of the deletion to the FAM 32 (S506).

Meanwhile, upon receiving the request for deletion in the IC area, the Felica OS 35 executes deletion of the targeted service on the Felica chip 34 (S507 and S508). At this point, when the Felica chip 34 detects an error, the Felica chip 34 generates error information (S509), and reports the error to the FAM 32 (S510). Upon receiving the error report, the FAM 32 does not delete the target data in the association table (S511), and only makes a request again (retry) for deletion to the Felica chip 34 corresponding to the deletion URL (S512). In addition, the retry is repeated until the request for deletion on the Felica chip 34 is normally transmitted. Intervals of retry are not limited particularly.

Upon receiving the request for deletion (S513), the Felica chip 34 performs deletion processing in the IC area (S514), and reports completion of the deletion to the FAM 32 (S515). Since the service (Felica content) is deleted on the Felica chip 34 and the i appli, the FAM 32 deletes data of the targeted service in the association table (S516). Then, the information is output to the IC menu (S517), and data of the displayed list (use rate in the IC area, name of the service and like) is overwritten (S518).

Thus, in the case of deleting Felica content, since the content can be deleted collectively from the Felica chip 34, Felica server and i appli, it is possible to delete the Felica content by simplified operation. In this case, when any one of the deletion processing is not finished normally, data of the Felica content is not erased in the association table of the FAM 32, and it is thus possible to prevent data related to the Felica content from being lost in the mobile terminal 11 before the Felica content is normally deleted.

With reference to FIG. 14, procedures will be described below for acquiring Felica content directly via the R/W in the mobile terminal 11. When acquiring Felica content from the external R/W 17, the mobile terminal 11 is brought near to the external R/W. At this point, the external R/W 17 and the Felica OS 35 mutually perform processing such as authentication (S601). When authentication is finished, the external R/W 17 transmits the Felica content to the mobile terminal 11 via the R/W of the terminal (S602). The Felica content is stored in the Felica chip 34. When the Felica content is stored in the Felica chip 34, the external R/W 17 and the Felica OS 35 mutually perform finish processing or the like (S603).

When the user opens the menu after the Felica content is thus acquired to the Felica chip 34 (S604), the menu requests the FAM 32 to refer to the association table (S605). Upon receiving the request, the FAM 32 issues a command to the Felica chip 34, and acquires a status of registration of Felica content stored in the Felica chip 34 (S606). Further, when there is a newly registered piece of the Felica content, the FAM 32 acquires the content information such as a service name from the Felica server (S607). The FAM 32 updates the association table using thus acquired content information (S608). Further, the FAM 32 sends a response indicative of a status of storage of the Felica content to the menu, and the menu performs image display according to the status of storage (S609).

Thus, in the mobile terminal 11 with the configuration as shown in FIG. 6, since it is possible to acquire Felica content directly from the external R/W without starting up the i appli, the Felica content can be acquired readily with easy user operation, thereby improving user convenience. Further, the content information related to the newly acquired Felica content is acquired from the Felica server when the content is directly acquired from the external R/W, whereby it is possible to manage the Felica content acquired from the external R/W in the same way as in the Felica content acquired through activation of the i appli.

When deleting Felica content on the screen as shown in FIG. 8, the FAM 32 requests a deletion URL in the association table to delete the Felica content. Thus, in the mobile terminal 11 with the configuration as shown in FIG. 6, since it is possible to delete Felica content on the screen without starting up the i appli, the Felica content can be deleted readily with easy user operation, thereby improving user convenience.

In this way, in the mobile terminal 11 according to the present invention, since it is possible to manage Felica content, while acquiring and deleting Felica content with ease, the Felica content can be acquired or deleted with easy user operation, i.e. by acquiring Felica content from the external R/W 17 or deleting Felica content on the screen of the mobile terminal 11.

Figure 15:
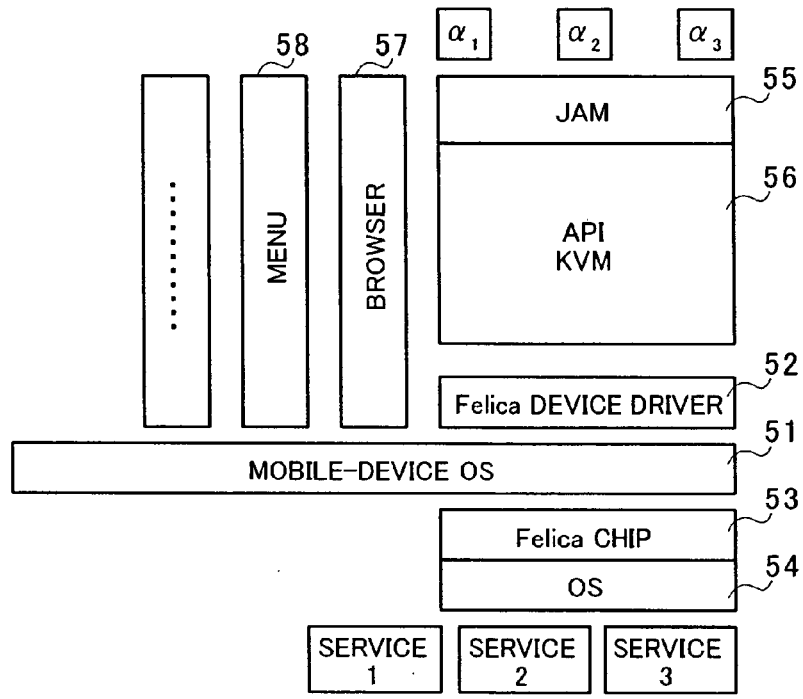
FIG. 15 is a diagram illustrating another internal configuration of a mobile terminal device.

In order to clarify the effects of the present invention, following descriptions are given of acquisition and deletion of Felica content in a mobile terminal without the FAM 32. FIG. 15 is a diagram illustrating an internal configuration of a mobile terminal device without the FAM. The configuration as shown in FIG. 15 principally has a mobile-device OS 51 that executes various functions of the mobile terminal, a Felica OS 54 that is an operation system for Felica, a Felica device driver 52 that drives the Felica OS 54, and a Felica chip 53 that stores Felica content. On the Felica OS 54 operate JAM 55 that manages Java applications, API to start up a browser and KVM (K Virtual Machine) 56 that is a device to execute API, and other applications such as, for example, a browser 57 and menu 58.

Figure 16:
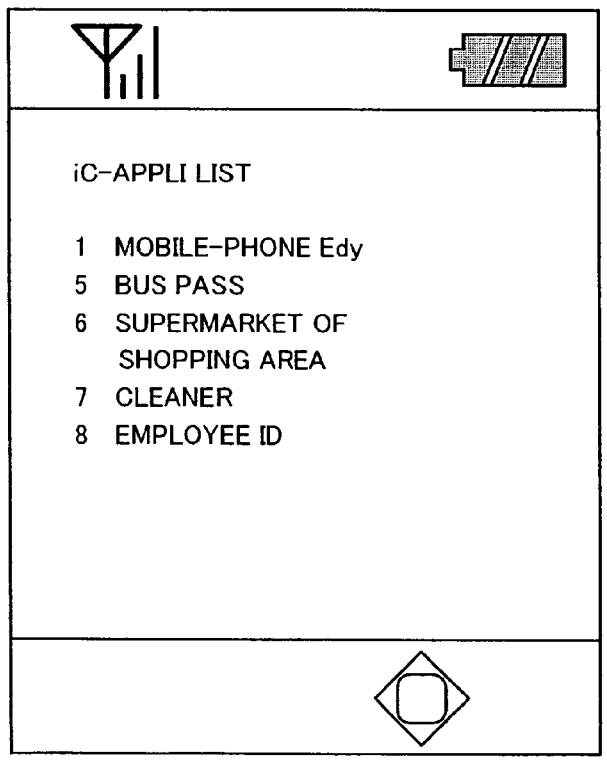
FIG. 16 is a diagram illustrating contact-less card function content on a display screen of the mobile terminal device as shown in FIG. 15.

In the configuration as shown in FIG. 15, since the FAM does not exist, the Felica OS 54 controls network computing concerning Felica, and cannot control the browser 57 and menu 58. Therefore, it is not possible to divide pieces of Felica content to display for each area, and all the pieces of Felica content are simply displayed as shown in FIG. 16. Further, since the FAM does not exist, acquisition and deletion of the Felica content is only allowed via the application, and it is not possible to directly acquire the Felica content from the external R/W as shown in FIG. 14. Therefore, an i appli should be initiated to acquire and delete the Felica content.

Meanwhile, in the mobile terminal 11 of the present invention, since the FAM 32 is provided which controls acquisition and deletion of Felica content via an application that provides the Felica content, while controlling acquisition of Felica content from the external R/W, it is possible to manage the Felica content, while directly acquiring Felica content from the external R/W, and therefore, it is possible to acquire and delete Felica content with easy operation.

The aforementioned embodiment describes the case where FAM functions are incorporated into the mobile terminal device, but it may be possible that the FAM functions and Felica content data according to the present invention are stored in an IC card such as a UIM card (User Identity Module card) and SIM card (Subscriber Identity Module card) and that the IC card is detachable to the mobile terminal device. In this case, the mobile terminal device is provided with a card insertion opening such as a slot to which the IC card is inserted. By thus storing the FAM functions (FAM, Felica device driver, Felica chip and Felica OS) in an IC card and inserting the IC card into another mobile terminal device, it is possible to use Felica content stored in the IC card in the another mobile terminal device. It is thereby possible to move the Felica content between mobile terminal devices optionally, thus increasing flexibility in use of the Felica content.

When the FAM functions are thus installed in an IC card, it may be possible to install part of the FAM functions in a mobile terminal device, while installing the remaining FAM functions in the IC card. For example, in the IC card is stored the association table used by the FAM to manage various kinds of content, while in the mobile terminal device is stored the other FAM control functions (device, program and application) such as the FAM, Felica device driver, Felica chip and Felica OS. By thus separating the FAM functions to store in different storage locations, it is possible to enhance the security concerning the Felica content.

When the association table is thus stored in an IC card, as shown in FIG. 17, it is preferable that the association table is provided with an area for user authentication information (for example, user ID and password), and that user authentication is carried out using the association table when the IC card is used. For example, when the IC card storing such an association table is detached from the mobile terminal device and inserted into another mobile terminal device to use the Felica content, the FAM installed in the mobile terminal device identifies an ID of the IC card, and in the case where an unknown user is using the IC card, i.e. the ID is different from an ID of the device with the FAM, performs user authentication. At this point, the FAM requires the user to input a user ID and password. In addition, in order to more increase the level of security, it is preferable to use biometric techniques such as fingerprint matching.

In addition, screen configurations as shown in FIGS. 3 to 5 and FIG. 8 are one example for a user to easily recognize service names of Felica content currently stored in a mobile terminal of the user and remaining storage capacity of each area, and screen configurations are not limited to those shown herein as long as the user is capable of easily performing processing such as "deletion".

For example, instead of displaying a list for each area as shown in FIGS. 3 to 5, a screen configuration may be used such that service names of all the areas are listed on one page. In this case, in adding new content, when it is required to delete already-existing content for lack of capacity, content to delete is that in the same area as the area to store the new content. For example, when the new content is content to be stored in the free area and it is necessary to delete content in adding the new content, it is preferable that content already stored in the free area is deleted first, and that content stored in other areas cannot be deleted. For example, when the free area lacks the capacity in adding new content to the free area, only content stored in the free area is made allowed to be selected as "deletion target content" on a screen displaying a list of service names of all the areas. More specifically, the color of characters and/or a range of only content stored in the free area is changed, or characters and/or a range of content stored in areas except the free area is displayed in gray. By providing such an embodiment, the user is capable of browsing all the service once on a single list displayed screen, thus improving operability in searching for specific service. Further according to this embodiment, it is possible to prevent unrelated content from being deleted in deleting content for lack of capacity.

Moreover, such a design is applicable that in a state where a list of service names of all the areas is displayed on a single page, the screen is changed to a screen to display a list for each area as shown in FIGS. 3 to 5 in performing processing of "acquisition and "deletion".

The present invention is not limited to the aforementioned embodiment, and is capable of being carried into practice in various modifications thereof. For example, the present invention is not limited to the configuration as described in the aforementioned embodiment, and is capable of being carried into practice in appropriate modifications without departing from the scope of the present invention. For example, while the above-mentioned embodiment describes the case of using the FAM as a controller that activates a browser, menu and Felica viewer as well as Felica, the present invention allows the use of another controller and/or another manager capable of activating the browser, menu and Felica viewer as well as Felica. Further, the embodiment describes the case that the contact-less card function is Felica, but the present invention is similarly applicable to cases that the contact-less card function is another contact-less card function other than Felica.

What is claimed is:

1. A mobile communications terminal comprising:
a terminal body;
a terminal operation system that operates various functions used in the terminal body, the various functions include a viewer function;
a contact-less card storage that stores contact-less card function content;
a contact-less card function controller that performs control to use the contact-less card function content using the various functions; and
an acquirer that acquires the contact-less card function content,
wherein the contact-less card function controller has an association table that associates acquired contact-less card function content with an application that provides the contact-less card function content, and manages the contact-less card function content using the association table, and based on the association table, generates a display screen to add and delete the contact-less card function content using the viewer function, the association table comprising: information for each piece of the contact-less card function content, the information including a registration date and an area where each piece of the contact-less card function content is located; and a deletion Uniform Resource Locator (URL) for each piece of the contact-less card function content used in deleting the contact-less card function content without initiating the application associated with the contact-less card function content, and the contact-less card function controller requests to the deletion URL in deleting the contact-less card function content on a display screen when a viewer function is used.

2. The mobile communications terminal as defined by claim 1 wherein said contact-less card function controller updates the contact-less card function content in the association table when new contact-less card function content is added to the contact-less card storage.

3. The mobile communications terminal as defined by claim 1 wherein the contact-less card storage has a plurality of areas to store the contact-less card function content.

4. The mobile communications terminal as defined by claim 3 wherein the various functions include a viewer function, and using the viewer function, the contact-less card function controller displays the contact-less card function content for each of the plurality of areas in the storage.

5. The mobile communications terminal as defined by claim 4 wherein the contact-less card function controller deletes the contact-less card function content on the display screen in using the viewer function.

6. The mobile communications terminal as defined by claim 1 wherein said contact-less card function controller updates the contact-less card function content in the association table when new contact-less card function content is added to the contact-less card storage.

7. The mobile communications terminal as defined by claim 1 wherein the contact-less card function controller issues a command for management of acquired contact-less card function content.

8. A mobile communications terminal comprising:
a terminal body;
a contact-less card storage that stores contact-less card function content;
a contact-less card function controller that performs control to use the contact-less card function content; and
an acquirer that directly acquires the contact-less card function content, wherein the contact-less card function controller has an association table that associates the contact-less card function content with an application that provides the contact-less card function content, and performs control of acquisition and deletion of the contact-less card function content via an application, while further performing control of acquisition of the contact-less card function content via the acquirer, and based on the association table, generates a display screen to add and delete the contact-less card function content, the association table comprising: information for each piece of the contact-less card function content, the information including a registration date and an area where each piece of the contact-less card function content is located; and a deletion Uniform Resource Locator (URL) for each piece of the contact-less card function content used in deleting the contact-less card function content without initiating the application associated with the contact-less card function content, and the contact-less card function controller requests to the deletion URL in deleting the contact-less card function content on the display screen when a viewer function is used.

9. A contact-less card function management system comprising:
a mobile communications terminal including a terminal body;
a terminal operation system that operates various functions used in the terminal body, the various functions include a viewer function;
a contact-less card storage that stores contact-less card function content;
a contact-less card function controller that performs control to use the contact-less card function content using the various functions;
an acquirer that acquires the contact-less card function content; and
a contact-less card function content server which is connected to the mobile communications terminal via a network, and stores a plurality of pieces of contact-less card function content obtained from providers that provide the contact-less card function content,
wherein the contact-less card function controller has an association table that associates acquired contact-less card function content with an application that provides the contact-less card function content, and manages the contact-less card function content using the association table, and based on the association table, generates a display screen to add and delete the contact-less card function content using the viewer function, the association table comprising: information for each piece of the contact-less card function content, the information including a registration date and an area where each piece of the contact-less card function content is located; and a deletion Uniform Resource Locator (URL) for each piece of the contact-less card function content used in deleting the contact-less card function content without initiating the application associated with the contact-less card function content, and the contact-less card function controller requests to the deletion URL in deleting the contact-less card function content on a display screen when a viewer function is used.

10. A contact-less card function acquisition system comprising:
a mobile communications terminal; and
a server of a provider that is connected to the mobile communications terminal via a network and that provides contact-less card function content,
wherein said mobile communications terminal has
a terminal body;
a contact-less card storage that stores the contact-less card function content;
a contact-less card function controller that performs control to use the contact-less card function content; and
an acquirer that directly acquires the contact-less card function content,
the contact-less card function controller has an association table that associates acquired contact-less card function content with an application that provides the contact-less card function content, manages the contact-less card function content using the association table, generates a display screen to add and delete the contact-less card function content, and when the contact-less card function content is acquired via the acquirer on the display screen, acquires content information related to the acquired contact-less card function content from the server, the association table comprising: information for each piece of the contact-less card function content, the information including a registration date and an area where each piece of the contact-less card function content is located; and a deletion Uniform Resource Locator (URL) for each piece of the contact-less card function content used in deleting the contact-less card function content without initiating the application associated with the contact-less card function content, and the contact-less card function controller requests to the deletion URL in deleting the contact-less card function content on the display screen when a viewer function is used.

* * * * *